Patented Dec. 10, 1946

2,412,545

UNITED STATES PATENT OFFICE 2,412,545

COATING AGGREGATE WITH BITUMINOUS EMULSIONS

Vilas E. Watts, San Francisco, Calif., assignor to American Bitumuls Company, San Francisco, Calif., a corporation of Delaware No Drawing. Application August 3, 1940, Serial No. 351,079

13 Claims. (Cl. 106—277)

This invention relates to bituminous materials useful for coating or covering various kinds of objects and to a composition comprising an object coated with a bituminous material and, more particularly, to increasing or strengthening the bond or adhesion between a hydrophilic object and the bituminous material coated thereon, and thus obtaining a firmer and more permanent adhesion or bonding of the bituminous material to such object, especially in the presence of water, by the incorporation into the bituminous material of an agent effective for this purpose.

It is an object of this invention to make a bituminous material, such as an asphalt, having a strengthened bond or adhesiveness for a hydrophilic object against the deteriorating action of water and to provide a process for making such a bituminous material.

It is another object of this invention to make a water-in-oil type of emulsion of bituminous material, such as asphalt, having a strengthened bond for a hydrophilic object and to provide a process for making such a bituminous material.

Another object of this invention is to make an asphalt composition comprising an object coated with a bituminous material, which asphalt composition has a bond between the bituminous material and even a hydrophilic object resistant to the deteriorating action of water.

Other and further important objects of this invention will become apparent from the description which follows and the appended claims.

In the coating or covering of various objects with bituminous materials or bituminous compositions, such as asphalt, for example, it has been found that the bituminous material may not readily coat many substances, or, if it does coat them, the bond or the adhesion between the bituminous material and the substance is too insecure to endure under conditions of use, especially in the presence of water and particularly water vapor, for a satisfactory length of time. This difficulty with respect to the bonding or adhesion between the bituminous material and the substance or object coated therewith has been found to be an especially troublesome problem when the substance to be coated is hydrophilic in character, that is, preferentially wetted by water. For example, in the making of asphaltic compositions by coating a mineral aggregate with an asphalt for the surfacing of a highway, many aggregates are found to have a greater affinity for water than for the asphalt, that is, such aggregates are relatively hydrophilic. Hence, even when such aggregate is coated with the asphalt, water in vapor form has a tendency to permeate the asphalt to the surface of the aggregate and, since the aggregate is hydrophilic, a water film intervenes between the asphalt and the aggregate, and in this manner tends to loosen and strip the asphaltic coating from aggregate of this character. Thus, because it is hydrophilic, such aggregate tends to become coated by the water, for which it has a greater affinity, instead of the asphalt. Thus it is apparent that to obtain a bond or adhesion of bituminous material, such as asphalt, to hydrophilic aggregate which will be secure and permanent, especially in the presence of water, particularly water vapor which is normally present in the atmosphere, is a major problem the solution of which is of inestimable value to the highway building industry alone, not to mention the value to numerous other industries.

I have now discovered that the adhesiveness of a bituminous material, such as an asphalt, especially for a hydrophilic object, can be substantially increased by treating the bituminous material with an alkali metal dichromate, particularly sodium or potassium dichromate and including ammonium and lithium dichromate. Moreover, the bituminous materials, when so treated, may be emulsified to form an oil-in-water type of emulsion without destruction of the improvement in adhesiveness, and furthermore, there is no adverse effect upon the bituminous material treated in accordance with this invention. If in some cases the desired quantity of the dichromate added makes the bituminous material somewhat sensitive to emulsification, this may, of course, be overcome by the use of such means known to the art as emulsification aids.

In accordance with this invention the bituminous material, such as an asphalt, is preferably treated by incorporating into the bituminous material, made fluid, if necessary, by heating or fluxing with light fractions, from about .05 to about 2% by weight of the dichromate in the form of about a 10% solution, by mixing the solution into the bituminous material, preferably with a high degree of agitation. The solution produces with the bituminous material a water-in-oil emulsion, sometimes referred to as a "reverse emulsion" when thought of with respect to the ordinary oil-in-water emulsion. This water may be wholly or partially removed by careful heating, if desired. Although the proportions of the potassium dichromate added may vary from about .05 to about 2% by weight, the preferred working range is from about .1 to about 1% and the optimum range for the best results is about 0.5%.

Moreover, although these proportions here given will usually be found to be effective as indicated, proportions greater than 2% will also be found to improve adhesiveness but not in proportion to any greater proportion used, and too large proportions may make emulsification of the treated bituminous material to the oil-in-water type of emulsion more difficult. Furthermore, the proportion added to the bituminous material should, in general, bear some relation to the extent of the surface intended to be coated with the bituminous material.

In order to obtain optimum distribution of the dichromate throughout the asphalt, the dichromate is preferably added with a high degree of agitation and in solution form. About a 10% solution will usually be found satisfactory. More dilute solutions may be used, however, and the extent of dilution may depend on the quantity of water desired in the resulting water-in-oil emulsion when it is desired to have the bituminous material in this form. Moreover, warming the solution prior to adding to the bituminous material will also assist in this respect, but the solution may be added while cool.

Another method of incorporating the dichromate into the bituminous material such as asphalt is by spraying the solution of the dichromate on the surface of hot asphalt, allowing the water to flash off, and then the dichromate remaining on the surface of the asphalt is mixed into the asphalt by agitation. Crystals, preferably finely divided, may also be mixed into the asphalt by agitation for the purpose of this invention, and after a period of time any excess crystals may be removed from the asphalt by passing it through a screen. To obtain the best results with respect to increasing the adhesiveness of the asphalt, it is preferable that some water be present with the dichromate. Apparently the dichromate should be in solution; however, I do not intend to be limited to any theoretical explanation.

The following examples are given to illustrate the invention and it is not intended that the broad invention herein disclosed be limited to any of the specific details given in these illustrative examples:

Example 1

5.0 per cent of a 10 per cent solution of sodium dichromate, containing 0.5 per cent of sodium dichromate, was mixed by agitation into 95% of an MC-1 cutback, the asphalt component of which was derived from a California crude, and a water-in-oil emulsion was formed. The temperature of the cutback was 140° F., and the temperature of the solution was 80° F. The resulting water-in-oil emulsion had the following formula:

|  | Per cent |
|---|---|
| MC-1 cutback | 95.0 |
| Water | 4.5 |
| Sodium dichromate | 0.5 |

A sample of this cutback so treated, and a sample untreated were each used to coat a Massachusetts rhyolite, a highly hydrophilic aggregate, and each of the resulting mixtures was allowed to cure at 140° F. for 48 hours. After curing each of these mixtures (hydrophilic aggregate coated with treated asphalt and untreated asphalt, respectively) were tested for adhesiveness by the test given below, and it was found that the treated asphalt showed a substantial improvement over the untreated asphalt.

*Test for adhesiveness.*—A 50-gram sample of the mixture is placed in a 600-ml. Pyrex beaker containing 400 cc. of boiling distilled water, and the whole is boiled for three minutes, during continuous stirring with a ⅜-inch diameter glass rod, moved in a circular motion at a rate of 60 times per minute. The beaker and its contents are then removed from the flame and allowed to stand until ebullition has ceased. The water is then poured off and the aggregate dumped out of the beaker onto a piece of absorbent paper. When dry, the mixture is visually examined for loss of coating. The proportion of aggregate remaining coated is determined by an experienced operator by visual inspection. This test is a severe test for adhesiveness and is, in fact, far more severe than conditions usually encountered in practice, and provides a very effective test for adhesiveness.

Example 2

40.0 per cent of a solution of sodium dichromate, containing 0.5 per cent of sodium dichromate, was mixed by agitation into 60.0 per cent of an S. C.-2 asphalt oil, derived from a California crude, and a water-in-oil emulsion was formed having the following formula:

|  | Per cent |
|---|---|
| S. C.-2 asphalt oil | 60.0 |
| Water | 39.5 |
| Sodium dichromate | 0.5 |

This material was tested by using a sample of the treated asphaltic oil and a sample of the untreated asphaltic oil as a prime to coat a Massachusetts rhyolite, a highly hydrophilic aggregate, followed by coating with a hard paving asphalt in each case. A sample of each of the resulting coated aggregates was cured and tested as in Example 1, and it was found that the dichromate had greatly improved the adhesiveness over the untreated asphaltic oil.

Either potassium dichromate or sodium dichromate may be used for the purposes of this invention, and lithium and ammonium dichromates may also be used, but they are, of course, more costly. It has also been found that instead of the alkali metal dichromates, the corresponding chromate salts may be used with good results, and although the alkali metal chromates, particularly sodium and potassium chromates, are better with regard to improvement of adhesiveness than anything heretofore known in the art, the dichromate form of the salt is far more effective than the chromate form. In general, it has been found that the dichromate is from one and a third to one and a half times as effective for the purposes of this invention than the chromate. Other alkali metal salts of oxy-acids of chromium may be used for the purposes of this invention and hence, more broadly stated, this invention contemplates the use of an alkali metal salt of an oxy-acid of chromium.

The term "bituminous emulsions," as herein used, embraces emulsions of asphalt, pitch, tar, oil and other similar hydrocarbon products which are normally solid, semi-solid, highly viscous, or fluid, or mixtures thereof.

As used in the appended claims, the term "alkali metal chromate," where otherwise unqualified, is intended to include normal chromates (such as $Na_2CrO_4$) and dichromates (such as $Na_2Cr_2O_7$).

In the disclosure of my invention, reference is made to specific examples to illustrate the best ways known of making and using it; however, the invention sought to be protected by Letters Patent of the United States is not to be construed to be limited to the specific details of such examples, but includes variations and modifications within the scope and extent of the appended claims.

I claim:

1. In a process of coating hydrophilic aggregate with a bitumen which normally lacks the capacity to adhere strongly to hydrophilic aggregate in the presence of water, wherein said bitumen in a form in which it is in the continuous phase is applied to the aggregate, the improvement comprising applying to the aggregate bitumen containing a small amount, sufficient to increase substantially the adhesiveness of the bitumen to the aggregate, of an alkali metal salt of an oxy-acid of chromium.

2. The improvement of claim 1, wherein said bitumen is asphalt.

3. The improvement of claim 1, wherein said metal salt is an alkali metal chromate.

4. In a process of coating hydrophilic aggregate with asphalt, the improvement comprising applying to the aggregate asphalt in which is dispersed an aqueous solution of an alkali metal chromate in the form of a water-in-oil emulsion, said alkali metal chromate being present in a small amount sufficient to increase substantially the adhesiveness of the asphalt to the aggregate.

5. The improvement of claim 4, wherein the asphalt is applied to the aggregate in molten form.

6. The improvement of claim 4, wherein the asphalt is applied to the aggregate in the form of a cutback.

7. The improvement of claim 4, wherein said alkali metal chromate is potassium dichromate.

8. The improvement of claim 4, wherein said alkali metal chromate is sodium dichromate.

9. The improvement of claim 4, wherein said alkali metal chromate is present in the asphalt in the amount of about 0.1 to 1% by weight.

10. A composition for coating aggregate, comprising asphalt in which is dispersed an aqueous solution of an alkali metal chromate in the form of a water-in-oil emulsion, said chromate being present in small amount sufficient to increase substantially the adhesiveness of the asphalt to hydrophilic aggregate.

11. The composition of claim 10, wherein said alkali metal chromate is potassium dichromate.

12. The composition of claim 10, wherein said alkali metal chromate is sodium dichromate.

13. The composition of claim 10, wherein the alkali metal chromate is an alkali metal dichromate and is present in the amount of 0.1 to 1% by weight of the composition.

VILAS E. WATTS.